(12) United States Patent
  Katsuno

(10) Patent No.: US 12,625,035 B2
(45) Date of Patent: May 12, 2026

(54) TIRE MANAGEMENT APPARATUS, PROGRAM AND TIRE MANAGEMENT METHOD

(71) Applicant: BRIDGESTONE CORPORATION, Tokyo (JP)

(72) Inventor: Hiroyuki Katsuno, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 148 days.

(21) Appl. No.: 18/569,704

(22) PCT Filed: Jun. 1, 2022

(86) PCT No.: PCT/JP2022/022379
  § 371 (c)(1),
  (2) Date: Dec. 13, 2023

(87) PCT Pub. No.: WO2023/007946
  PCT Pub. Date: Feb. 2, 2023

(65) Prior Publication Data
  US 2024/0272040 A1      Aug. 15, 2024

(30) Foreign Application Priority Data
  Jul. 27, 2021    (JP) ................................. 2021-122740

(51) Int. Cl.
  *G01M 17/02* (2006.01)
(52) U.S. Cl.
  CPC .................................. *G01M 17/02* (2013.01)
(58) Field of Classification Search
  CPC ................................ G01M 17/02; B60C 19/00
  (Continued)

(56) References Cited

U.S. PATENT DOCUMENTS

2001/0022802 A1* 9/2001 Kurata ................ G01M 17/027
                                                    374/45
2006/0235609 A1    10/2006 Mäkelä
            (Continued)

FOREIGN PATENT DOCUMENTS

CL            46868 B1     2/2005
CN      112572067 A     3/2021
            (Continued)

OTHER PUBLICATIONS

International Search Report for PCT/JP2022/022379 dated Aug. 9, 2022 (PCT/ISA/210).
            (Continued)

*Primary Examiner* — Tuan C To
*Assistant Examiner* — Dominick Mulder
(74) *Attorney, Agent, or Firm* — Sughrue Mion, PLLC

(57)            ABSTRACT

A tire management apparatus (10) for managing tires attached to a mining vehicle having a dual wheel includes a data acquisition interface (131) configured to acquire driving data on the mining vehicle, a wear state calculator (132) configured to define two or more calculation positions in one tire and calculate a wear state of the one tire at each defined calculation position based on the acquired driving data, and a wear state corrector (133) configured to perform correction of the calculated wear state to increase wear in a case in which the calculation position is on an outer side of mounting or an inner side of mounting of the dual wheel.

10 Claims, 5 Drawing Sheets

(58) Field of Classification Search

USPC ......................................................... 701/32.1

See application file for complete search history.

(56) References Cited

U.S. PATENT DOCUMENTS

| | | | | |
|---|---|---|---|---|
| 2014/0166168 A1* | 6/2014 | Engel | .................... | B60C 11/243 |
| | | | | 342/385 |
| 2015/0330773 A1* | 11/2015 | Uffenkamp | ............ | G01B 11/25 |
| | | | | 356/631 |
| 2019/0135048 A1* | 5/2019 | Thompson | .............. | B60C 11/24 |
| 2019/0265129 A1* | 8/2019 | Tamura | ................. | B60C 11/246 |
| 2019/0270347 A1* | 9/2019 | Stewart | ................... | B60C 11/24 |
| 2020/0009920 A1* | 1/2020 | Oki | ........................ | B60C 23/064 |
| 2020/0148010 A1* | 5/2020 | Oki | ........................ | G06Q 10/00 |
| 2020/0149997 A1* | 5/2020 | Demirel | .................... | G06T 7/55 |
| 2020/0189327 A1* | 6/2020 | Kintscher | .............. | B60C 23/20 |
| 2021/0125428 A1* | 4/2021 | Tedesco | .............. | G07C 5/0808 |
| 2021/0166503 A1* | 6/2021 | Shimomura | ........... | G06Q 10/00 |
| 2021/0402829 A1* | 12/2021 | Ishizaka | ............. | B60C 23/0408 |
| 2022/0001879 A1* | 1/2022 | Verheijen | ............. | B60W 40/09 |
| 2022/0194434 A1* | 6/2022 | Ha | .................. | B60W 60/00186 |
| 2022/0268577 A1 | 8/2022 | Suzuki et al. | | |
| 2022/0324266 A1* | 10/2022 | Alghooneh | ........... | B60C 11/246 |

FOREIGN PATENT DOCUMENTS

| | | | |
|---|---|---|---|
| JP | 05-281097 | A | 10/1993 |
| JP | 2002-131191 | A | 5/2002 |
| JP | 2005-028950 | A | 2/2005 |
| JP | 2010-285066 | A | 12/2010 |
| JP | 2017-156295 | A | 9/2017 |
| JP | 2021-037885 | A | 3/2021 |
| WO | 2004/085968 | A1 | 10/2004 |
| WO | 2019/180487 | A1 | 9/2019 |

OTHER PUBLICATIONS

Communication issued Mar. 3, 2025 in Chilean Application No. 202400021.

International Preliminary Report on Patentability (with translation of Written Opinion) dated Jan. 18, 2024 in International Application No. PCT/JP2022/022379.

* cited by examiner

TIRE MANAGEMENT APPARATUS, PROGRAM AND TIRE MANAGEMENT METHOD

CROSS REFERENCE TO RELATED APPLICATIONS

This application is a National Stage of International Application No. PCT/JP2022/022379 filed Jun. 1, 2022, claiming priority based on Japanese Patent Application No. 2021-122740 filed Jul. 27, 2021.

TECHNICAL FIELD

The present disclosure relates to a tire management apparatus, a program, and a tire management method.

BACKGROUND

Systems that acquire data on a vehicle in motion and estimate effects on the tires are known. For example, Patent Literature (PTL) 1 discloses a system that calculates the friction energy in each section of a driving mode and predicts the total wear of tires.

CITATION LIST

Patent Literature

PTL 1: JP 2017-156295 A

SUMMARY

Technical Problem

Among vehicles, mining vehicles are dump trucks and the like used for mining operations and have far larger vehicle bodies than ordinary trucks. In addition, mining vehicles travel on rough, unpaved roads. In the case of predicting the wear state of the tires of mining vehicles, prediction using a system designed for ordinary vehicles sometimes leads to a large deviation from the actual wear state.

In view of these circumstances, it is an aim of the present disclosure to provide a tire management apparatus, a program, and a tire management method that can accurately calculate the wear state of tires of mining vehicles.

Solution to Problem

A tire management apparatus according to an embodiment of the present disclosure is a tire management apparatus for managing tires attached to a mining vehicle having a dual wheel and includes a data acquisition interface configured to acquire driving data on the mining vehicle, a wear state calculator configured to define two or more calculation positions in one tire and calculate a wear state of the one tire at each defined calculation position based on the acquired driving data, and a wear state corrector configured to perform correction of the calculated wear state to increase wear in a case in which the calculation position is on an outer side of mounting or an inner side of mounting of the dual wheel.

A program according to an embodiment of the present disclosure is configured to cause a tire management apparatus for managing tires attached to a mining vehicle having a dual wheel to execute operations, the operations including acquiring driving data on the mining vehicle, defining two or more calculation positions in one tire and calculating a wear state of the one tire at each defined calculation position based on the acquired driving data, and performing correction of the calculated wear state to increase wear in a case in which the calculation position is on an outer side of mounting or an inner side of mounting of the dual wheel.

A tire management method according to an embodiment of the present disclosure is a tire management method to be executed by a tire management apparatus for managing tires attached to a mining vehicle having a dual wheel, the tire management method including acquiring driving data on the mining vehicle, defining two or more calculation positions in one tire and calculating a wear state of the one tire at each defined calculation position based on the acquired driving data, and performing correction of the calculated wear state to increase wear in a case in which the calculation position is on an outer side of mounting or an inner side of mounting of the dual wheel.

Advantageous Effect

According to the present disclosure, a tire management apparatus, a program, and a tire management method that can accurately calculate the wear state of tires of mining vehicles can be provided.

DETAILED DESCRIPTION

Figure 1:
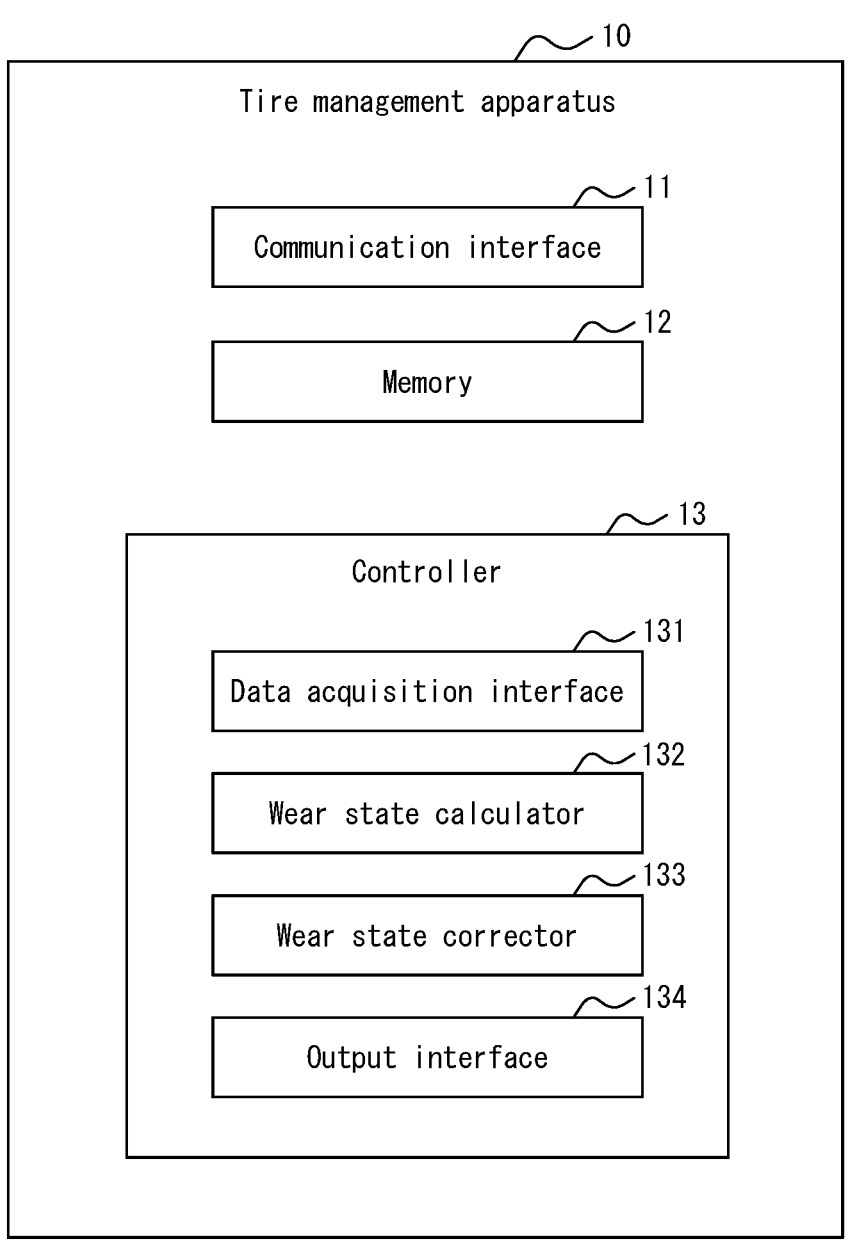
FIG. 1 is a diagram illustrating a configuration example of a tire management apparatus according to an embodiment of the present disclosure.

A tire management apparatus and a tire management method according to an embodiment of the present disclosure are described below with reference to the drawings. Identical or equivalent portions in the drawings are labeled with the same reference signs. In the explanation of the present embodiment, a description of identical or equivalent portions is omitted or simplified as appropriate.

Figure 2:
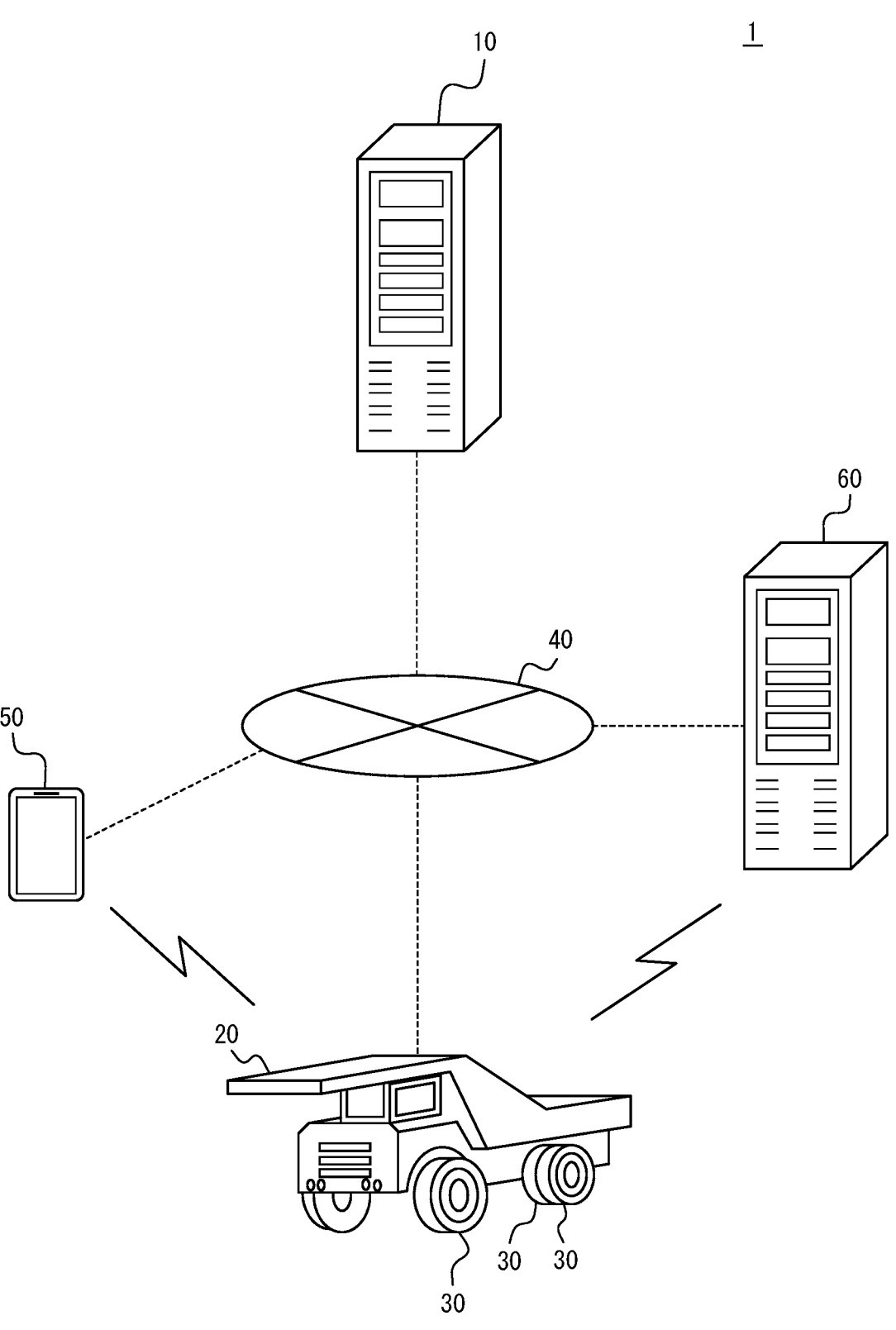
FIG. 2 is a diagram illustrating a configuration example of a tire management system that includes the tire management apparatus of FIG. 1.

FIG. 1 is a diagram illustrating a configuration example of a tire management apparatus 10 according to the present embodiment. FIG. 2 is a diagram illustrating a configuration example of a tire management system 1 that includes the tire management apparatus 10 of FIG. 1. The tire management apparatus 10 is an apparatus that manages tires 30 attached to a vehicle 20. The tire management apparatus 10 can manage the state of the tires 30 by calculating the wear state (as an example, the wear rate) and presenting the wear state to the user. Here, users include a user of the tire management apparatus 10 or the tire management system 1, in particular the driver of the vehicle 20.

In the present embodiment, the vehicle 20 is a mining vehicle. The mining vehicle is a dump truck or the like used for mining operations and has a far larger vehicle body than ordinary trucks. The mining vehicle also drives on rough, unpaved roads. In the present embodiment, the tire management apparatus 10 manages mining vehicles with dual wheels (double tires). Dual wheels refers to two tires 30 being provided on one side of an axle of the vehicle 20. In the present embodiment, the mining vehicle that is the vehicle is described as having only rear dual wheels, but as another example, the vehicle 20 may also have front dual wheels.

The tire management apparatus 10 includes a communication interface 11, a memory 12, and a controller 13. The controller 13 includes a data acquisition interface 131, a wear state calculator 132, a wear state corrector 133, and an output interface 134. The tire management apparatus 10 may have the hardware configuration of a computer, such as a server. Details of the constituent elements of the tire management apparatus 10 are described below.

The tire management apparatus 10, together with at least one terminal apparatus 50 and a server 60 connected by a network 40, may form a tire management system 1. The network 40 is, for example, the Internet, but may be a Local Area Network (LAN).

The terminal apparatus 50 is a general purpose mobile terminal such as a smartphone or tablet terminal, but these examples are not limiting. The terminal apparatus 50 is carried by a user. The terminal apparatus 50 may acquire driving data on the vehicle 20 and transmit the driving data to the tire management apparatus 10 via the network 40. The terminal apparatus 50 may also acquire information such as the wear state from the tire management apparatus 10 via the network 40 and function as a display apparatus that displays the information to the user. In a case in which an apparatus having a communication function is mounted in the vehicle 20, the terminal apparatus 50 may acquire the driving data by wireless communication with the apparatus.

The server 60 is, for example, a different computer than the tire management apparatus 10. The server 60 may, for example, be installed at an inspection facility for the vehicle 20. The server 60 may acquire driving data on the vehicle 20 and transmit the driving data to the tire management apparatus 10 via the network 40. The server 60 may also acquire information such as the wear state from the tire management apparatus 10 via the network and display the information on a display apparatus, such as a display, connected to the server 60. In a case in which an apparatus having a communication function is mounted in the vehicle 20, the server 60 may acquire the driving data by wireless communication with the apparatus.

The apparatus mounted in the vehicle 20 may be directly connectable to the network 40 and may transmit driving data to the tire management apparatus 10. The apparatus mounted in the vehicle 20 may be provided with a display. The apparatus mounted in the vehicle 20 may acquire information such as the wear state from the tire management apparatus 10 via the network and display the information on the display. The apparatus mounted in the vehicle 20 may be a driving support apparatus with a wireless communication function, but this example is not limiting.

Here, the tire management system 1 is not limited to the configuration illustrated in FIG. 2. For example, the tire management system 1 may be configured without the server 60. For example, the tire management system 1 may have a configuration such that an apparatus mounted in the vehicle 20 transmits driving data to the tire management apparatus 10 via the network 40, and the terminal apparatus 50 displays information, such as the wear state, received via the network 40 from the tire management apparatus 10 to the user.

The constituent elements of the tire management apparatus 10 are now described in detail. The communication interface 11 is configured to include one or more communication modules that connect to the network 40. The communication interface 11 may include a communication module corresponding to mobile communication standards, such as 4G (4th Generation) and 5G (5th Generation). The communication interface 11 may include a communication module corresponding to wired LAN standards (for example, 1000BASE-T). The communication interface 11 may include a communication module corresponding to wireless LAN standards (for example, IEEE802.11).

The memory 12 includes one or more memories. The memory can, for example, be a semiconductor memory, a magnetic memory, or an optical memory, but is not limited to these examples and can be any memory. The memory 12 is, for example, built into the tire management apparatus 10, but the memory 12 can also be configured to be accessed externally by the tire management apparatus 10 via any interface.

The memory 12 stores various data used in the various calculations performed by the controller 13. The memory 12 may also store the results and intermediate data of the various calculations performed by the controller 13.

In the present embodiment, the memory 12 stores functions (numerical models) used in processes such as calculation of the wear state of the tire 30 by the wear state calculator 132. Details of the numerical model are described below.

The controller 13 includes one or more processors. The processors can, for example, be a general purpose processor or dedicated processor specialized for specific processing, but these examples are not limiting, and any processor may be used. The controller 13 controls the overall operations of the tire management apparatus 10.

Here, the tire management apparatus 10 may have the following software configuration. One or more programs used to control the operations of the tire management apparatus 10 are stored in the memory 12. When read by the processor of the controller 13, the programs stored in the memory 12 cause the controller 13 to function as the data acquisition interface 131, the wear state calculator 132, the wear state corrector 133, and the output interface 134.

The data acquisition interface 131 acquires driving data on the vehicle 20. The driving data includes data on the state of driving of the vehicle 20. The driving data may also include data on the environment in which the vehicle 20 drives. The data on the state of driving of the vehicle 20 may, for example, include the acceleration, speed, position, and the like of the vehicle 20. In the present embodiment, the driving data includes acceleration data on the vehicle 20. The data on the environment may, for example, include the temperature, season, weather information including rainfall, road surface information, and the like for the location where vehicle 20 is driving. In the present embodiment, the driving data includes weather information including the presence or absence of rainfall and road surface information.

Acceleration may, for example, be measured by an acceleration sensor included in the vehicle 20. The acceleration data on the vehicle 20 may, for example, be acquired from an Electronic Control Unit (ECU) of the vehicle 20 via an in-vehicle network such as a Controller Area Network (CAN), an apparatus installed in the vehicle 20 and equipped a communication function, and the network 40. The data acquisition interface 131 may acquire the acceleration data as time series data, for example.

Here, the acceleration data includes not only the acceleration component towards the front side of the vehicle 20 (forward) or the acceleration component towards the opposite side from the front side of the vehicle 20 (backward), but also information on the acceleration component towards the lateral direction of the vehicle 20. The acceleration of the vehicle may be measured by accelerometers in two or more dimensions so that the forward or backward acceleration component and the lateral acceleration component can be measured simultaneously. The measurement of the acceleration of the vehicle 20 is performed every second, for example, but is not limited to this example.

The data on the environment may be information acquired via the network 40 by an apparatus mounted in the vehicle 20, for example. Such an apparatus may, for example, identify the position of the vehicle 20 by a Global Positioning System (GPS) function and acquire, via the network 40, the weather information and the road surface information based on the positional information. Furthermore, the apparatus mounted in the vehicle 20 may output the acquired data on the environment to the data acquisition interface 131. Here, the road surface information may include the type of minerals (such as coal, iron, or copper) in the mine where the vehicle 20, which is a mining vehicle, drives. The road surface information may also include a cone index indicating the strength of the road surface.

The driving data acquired by the data acquisition interface 131 may be stored in the memory 12 in association with the vehicle 20 or the driver of the vehicle 20. The tire management apparatus 10 may periodically calculate the wear state. In this case, the data acquisition interface 131 may periodically acquire the driving data.

The wear state calculator 132 calculates the wear state of the tire 30 based on the aforementioned acquired driving data. In the present embodiment, the wear state calculator 132 calculates the wear rate as the wear state of the tire 30. The wear rate is the amount of wear per predetermined driving distance. Here, the wear state of the tire 30 is not limited to the wear rate. Other examples of the wear state are the amount of wear, the distance that can be traveled until the wear life, and the expected wear life TI, described below.

Here, it is conventionally known that the wear of the tire 30 is affected by the force applied to the tire 30 by driving of the vehicle 20. For example, the wear rate of the tire 30 can be calculated based on the frictional energy Ew described in JP H11-326143 A. The friction energy Ew is a parameter that indicates the tendency for wear of the tire 30. The higher the friction energy Ew, the higher the wear rate of the tire 30 and the shorter the wear life.

In the present embodiment, the wear state calculator 132 calculates the friction energy Ew based on the driving data. The friction energy Ew is expressed by Equation (1) below. The friction energy Ew can be used to calculate the expected wear life TI of the tire 30, which is expressed by Equation (2) below. For example, in a case in which the wear state calculator 132 calculates the distance that can be traveled until the wear life of the tire as wear information, the distance that can be traveled can be estimated by multiplying the expected wear life TI by a coefficient determined by the type of tire 30.

$$Ew = Ewf + Ewa + Ews + Ewd + Ewb \qquad \text{Equation (1)}$$

$$TI = (G1/Ew) \times (NSD - 1.6) \qquad \text{Equation (2)}$$

In Equation (1), Ewf is the friction energy component of the tire 30 when free rolling. Ewa is the friction energy component of the tire 30 when toe angle is applied. Ews is the friction energy component of the tire when lateral force (left-right force) is applied. Ewd is the friction energy component of the tire when driving force is applied. Ewb is the friction energy component of the tire when braking force is applied. In Equation (2), G1 is the wear resistance index, which is an index of the wear performance of the top rubber in the tire 30. NSD is the groove depth (mm) of the tire 30. The "1.6" corresponds to the remaining groove of 1.6 (mm), which is considered the limit for rejecting the tire 30.

Ews, Ewd and Ewb in Equation (1) are the frictional energy components due to lateral force, driving force, and braking force and therefore vary depending on the driving conditions of the vehicle 20. The lateral force, driving force, and braking force are calculated based on the lateral, forward, and backward acceleration of the vehicle 20. In a case in which the driving data includes acceleration data, as in the present embodiment, the wear state calculator 132 can obtain the lateral, forward, and backward acceleration of the vehicle 20 from the acceleration data. In this way, the wear state calculator 132 can calculate the friction energy Ew based on the driving data.

Figure 3:
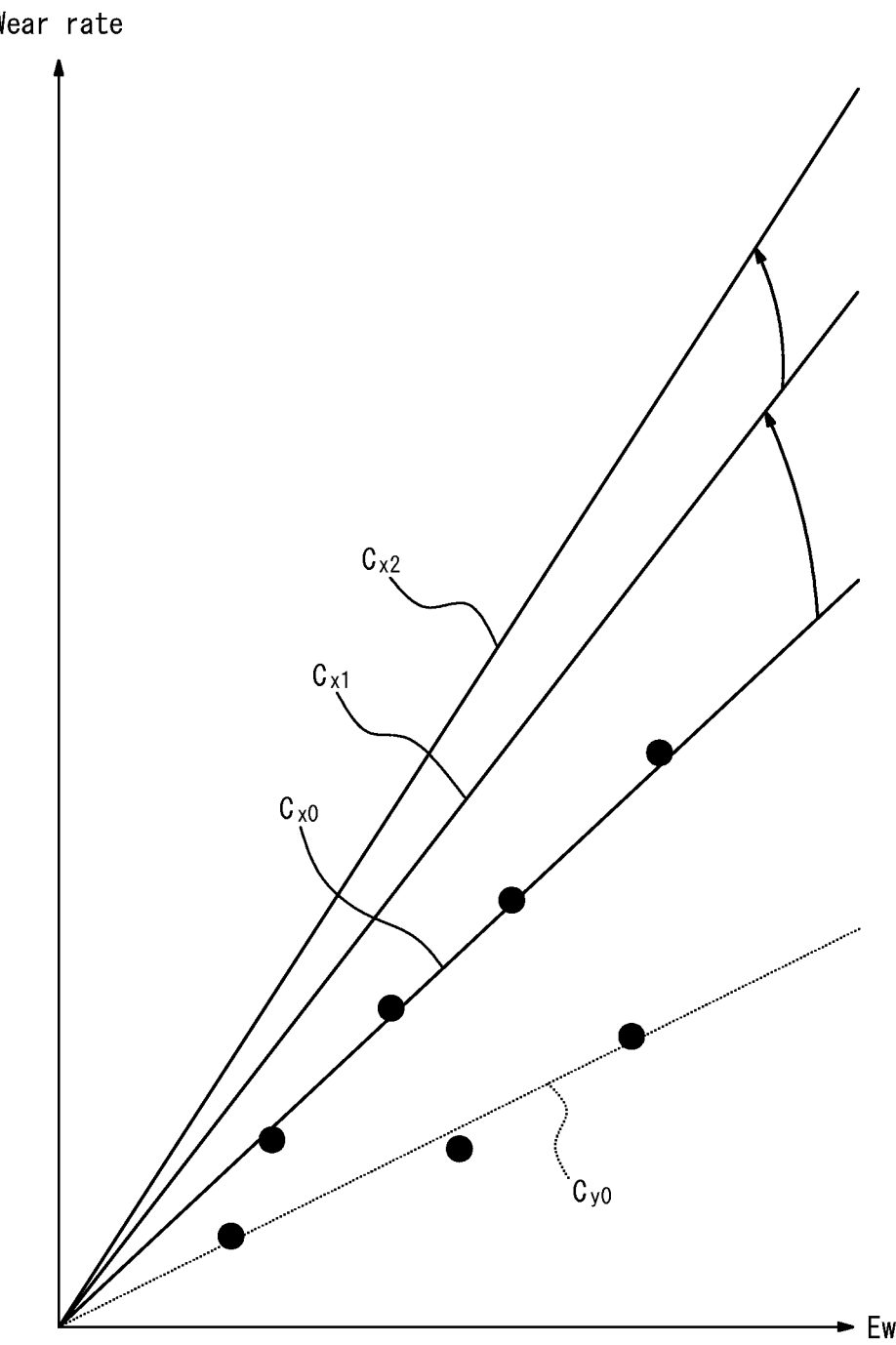
FIG. 3 is a diagram illustrating the relationship between frictional energy and wear rate.

The wear state calculator 132 reads a suitable function from the memory 12 according to the type of the tire 30. In the present embodiment, the function is a numerical model illustrating the relationship between friction energy Ew and wear rate, as illustrated in FIG. 3. The friction energy Ew and the wear rate for the tire 30 exhibit a proportional relationship. In the example in FIG. 3, $C_{x0}$ and $C_{y0}$ are numerical models for calculating the wear rate for each of the two types of tires 30. $C_{x0}$ and $C_{y0}$ may be determined based on past measured data, for example. The wear state calculator 132 calculates the wear rate (wear rate before correction) of the tire 30 by, for example, reading $C_{x0}$ in FIG. 3 and inputting the calculated friction energy Ew.

Here, the wear state calculator 132 calculates the wear rate for each of the tires 30 attached to the vehicle 20, which is a mining vehicle. For example, in a case in which the type of the tire 30 differs between the front and rear wheels, the wear state calculator 132 reads the appropriate function for each type of the tire 30 from the memory 12. In a case in which the types of the two tires 30 forming a dual wheel are different, for example, the wear state calculator 132 reads the appropriate function for each type of the tire 30 from the memory 12. Furthermore, the wear state calculator 132 defines two or more calculation positions (see Pf1, Pf2, Pr1 and Pr2 in FIG. 4) in one tire 30 and calculates the wear state of the tire 30 at each of the defined calculation positions. The calculation positions are defined at two or more different locations in the tread width direction of the tire 30. Compared to a general truck, the width of the tire 30 of a mining vehicle is also larger, and the wear state can be uneven as described below. Therefore, the wear state calculator 132 calculates the wear state at two or more calculation positions for one tire 30.

Figure 4:
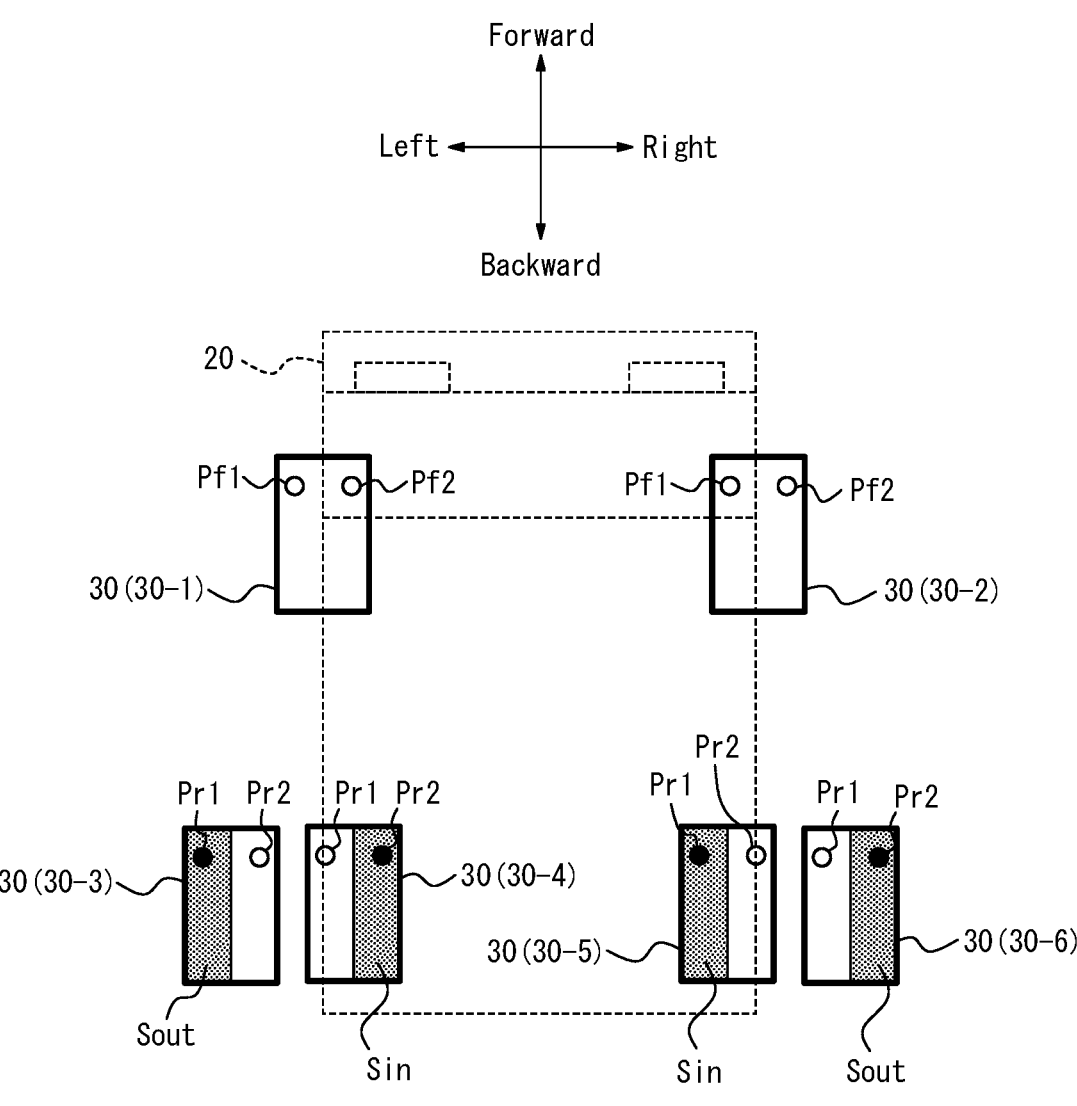
FIG. 4 is a diagram illustrating calculation positions of tires and correction.

Upon thoroughly investigating ways to further improve the accuracy of wear rate calculation, we discovered that the wear state of the tires 30 that make up the dual wheels of a mining vehicle is uneven. As illustrated in FIG. 4, the vehicle 20, which is a mining vehicle, has two tires 30-1 and 30-2 on the front wheels and four tires 30-3, 30-4, 30-5, 30-6 on the rear wheels, for example. In the example in FIG. 4, the left rear dual wheel is configured by tires 30-3 and 30-4. The right rear dual wheel is configured by tires 30-5 and 30-6. According to our analysis, the wear rate (amount of wear) is greater on the outer side of mounting of the dual wheel (Sout in FIG. 4) and on the inner side of mounting of the dual wheel (Sin in FIG. 4). For example, for tire 30-3 (or tire 30-6), the wear rate in the region of Sout, which is the outer side of mounting of the dual wheel, was 1.1 to 2.0 times greater than the wear rate in the region not included in Sout in the same tire 30. For tire 30-4 (or tire 30-5), the wear rate in the region of Sin, which is the inner side of mounting of the dual wheel, was 1.1 to 2.0 times greater than the wear rate in the region not included in Sin in the same tire 30. Here, the wear state was nearly even for the tires 30-1 and 30-2 on the front wheels, which are not dual wheels. The wear rate (amount of wear) sometimes differed depending on factors such as the strength of the road surface. For example, the wear rate is likely to increase on hard road surfaces by the tire 30 being scraped.

To reflect the aforementioned unevenness of the wear state in the calculation of wear rate, the wear state calculator 132 defines the two or more calculation positions so that at least one calculation position is included in the region on the inner side of mounting (or the region on the outer side of mounting) and at least one other calculation position is not included in that region. In the example in FIG. 4, the wear state calculator 132 defines two calculation positions, Pr1 and Pr2, for each of the four tires 30-3, 30-4, 30-5, and 30-6 on the rear wheels. For example, for tire 30-3, the wear state calculator 132 defines Pr1 to be included in Sout, which is the outer side of mounting of the dual wheel, and defines Pr2 not to be included in Sout. For tire 30-4, the wear state calculator 132 defines Pr2 to be included in Sin, which is the inner side of mounting of the dual wheel, and defines Pr1 not to be included in Sin. Here, the wear state calculator 132 also defines two calculation positions, Pf1 and Pf2, for each of the two tires 30-1 and 30-2 on the front wheels. The wear state calculator 132 calculates the wear state (wear rate) of the tire 30 at each of the defined calculation positions based on the acquired driving data. Here, the wear state calculator 132 may determine the wear rate at one of the two calculation positions of the same tire 30 based on the calculation results for the other calculation position. For example, the wear state calculator 132 may calculate the wear rate at Pr1 for tire 30-6, for example, and assume that the wear rate at Pr2 is the same. In other words, the wear rate before correction may be the same at all calculation positions for one tire 30.

To reflect the aforementioned unevenness of the wear state in the calculation of wear rate, the wear state corrector 133 corrects the calculated wear state to increase wear in a case in which the calculation position is on the outer side of mounting or the inner side of mounting of the dual wheel. The wear state corrector 133 corrects the wear rate for calculation positions, among the calculation positions defined by the wear state calculator 132, that are included on the outer side of mounting or the inner side of mounting of the dual wheel. In the example in FIG. 4, the wear rates of Pr1 in tire 30-3, Pr2 in tire 30-4, Pr1 in tire 30-5, and Pr2 in tire 30-6, indicated by black circles, are corrected.

In the example in FIG. 3, in a case in which the wear rate before correction is calculated using $C_{x0}$, the wear state corrector 133 may correct to the wear rate indicated by $C_{x1}$. In a case in which the friction energy Ew and the wear state (wear rate) of the tire 30 have a linear relationship, as in FIG. 3, the wear state corrector 133 may perform correction by multiplying the value before correction by a correction factor. The correction factor may be a value greater than 1, such as a factor increasing the value before correction by 1.1 to 2.0 times. The value of the correction factor may vary depending on the position of the tire 30 or the like. For example, the correction factor at Pr1 on the tire 30-3 may be 1.3, and the correction factor at Pr2 on the tire 30-4 may be 1.5. The value of the correction factor may be determined for each calculation position based on data such as past actual data on the unevenness of the wear state.

As mentioned above, the driving data may include data on the environment in which the vehicle 20 drives. The wear state corrector 133 may adjust the correction factor used in correction based on the data on the environment. The adjustment based on data on the environment allows the influence of the driving environment on tire wear to be appropriately reflected in the calculation of the wear state of the tire 30. In the example in FIG. 3, in a case in which the wear rate before correction is calculated using $C_{x0}$ and the wear rate without adjustment based on data on the environment is indicated by $C_{x1}$, the wear state corrector 133 may perform adjustment so that the wear rate is indicated by $C_{x2}$. In a case in which the friction energy Ew and the wear state (wear rate) of the tire 30 have a linear relationship, as in FIG. 3, the wear state corrector 133 performs correction by multiplying the value before correction by a correction factor, and the value of that correction factor may be adjusted based on the data on the environment.

In the present embodiment, the data on the environment includes weather information including the presence or absence of rainfall. The wear state corrector 133 may adjust the correction factor to increase wear in a case in which rainfall is determined to be present based on the weather information. The adjustment based on weather information allows the influence of rainfall on tire wear to be appropriately reflected in the calculation of the wear state of the tire 30. When there is rainfall, the wear rate of the tire 30 of the mining vehicle is likely to increase, since the surface of the tire 30 is more easily scraped by the road surface due to the wheel slipping. Therefore, in a case in which the value of the correction factor before adjustment is 1.5 (i.e., the wear rate before correction is increased by a factor of 1.5), for example, the wear state corrector 133 may adjust the value of the correction factor to 1.6. Here, for general vehicles traveling on paved roads, wear is smaller when there is rainfall. The effect of rainfall on the wear of the tire 30 is exactly the opposite for general vehicles and mining vehicles, and it is thought that the prediction accuracy can be greatly improved by the wear state corrector 133 correcting for rainfall for mining vehicles.

In the present embodiment, the data on the environment includes road surface information on the road surface on which the mining vehicle drives. The wear state corrector 133 may adjust the correction factor according to properties of the road surface based on the road surface information. The adjustment based on the road surface information allows the influence of the properties of the road surface on tire wear to be appropriately reflected in the calculation of the wear state of the tire 30. For example, in a case in which the type of mineral in the mine where the vehicle 20 drives is coal rather than iron or copper, the wear rate will be relatively small. Therefore, in a case in which the value of the correction factor before adjustment is 1.5 based on iron, for example, the wear state corrector 133 may adjust the value of the correction factor to 1.4. Here, the wear state corrector 133 may adjust the correction factor using the cone index instead of the type of mineral.

In this way, the wear state corrector 133 can reflect the unevenness of the wear state in the tires 30 of the mining vehicle by correcting the calculated wear state to increase the wear in a case in which the calculation position of the wear state is on the outer side of mounting or the inner side of mounting of the dual wheel. The wear state corrector 133 can adjust the amount of correction according to the environment in which the mining vehicle drives. The accuracy of the calculated wear rate can thereby be increased.

The output interface 134 outputs the wear rate calculated by the wear state calculator 132 to a display apparatus or the like. In a case in which correction is performed by the wear state corrector 133, the output interface 134 outputs the corrected wear rate to the display apparatus or the like. As described above, the display or the like of the terminal apparatus 50 and the server 60 can function as display apparatuses that display the wear rate to the user. For example, information on the wear state may be displayed on the screen of the terminal apparatus 50, along with the wear state (wear rate in the present embodiment). The information on the wear state can be information for managing the tire 30 based on the wear state, such as advice to replace the tire 30. For example, in a case in which the wear rate is high, a suggestion to change to a more wear resistant tire 30 may be displayed. The information on the wear state may be stored as fixed phrases, for example, in the memory 12 and may be selected by the output interface 134. In a case in which the wear state is displayed on a display or the like installed in an inspection facility, the timing for replacement of the tires 30 on the vehicle 20 may be determined based on the information, and suggestions for changing the mounting position of the tires 30 (such as the front and rear wheels, or outer and inner sides of mounting of the dual wheel) may be made.

Figure 5:
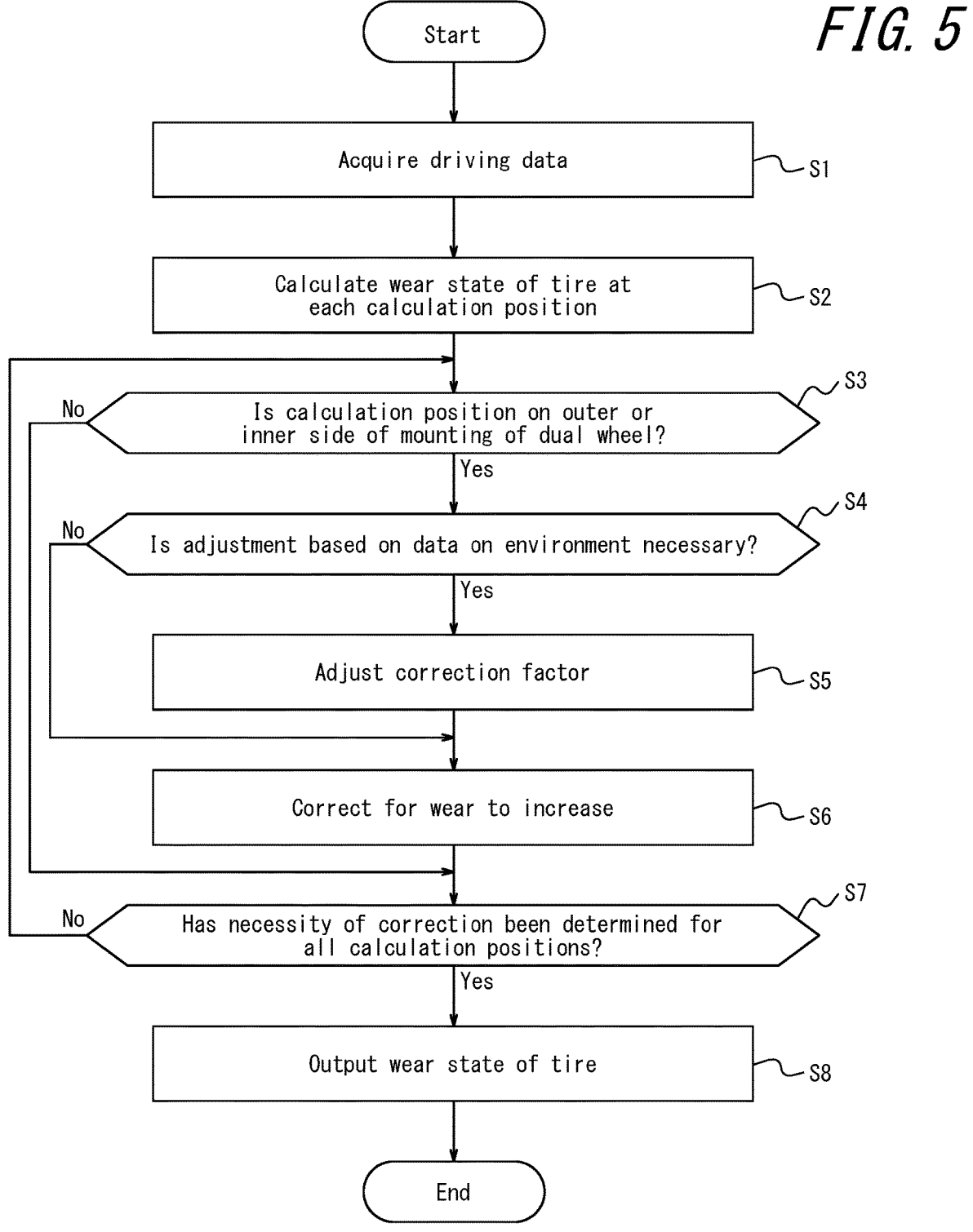
FIG. 5 is a flowchart illustrating an example of a tire management method according to an embodiment of the present disclosure.

FIG. 5 is a flowchart illustrating an example of a tire management method to be executed by the tire management apparatus 10 according to an embodiment of the present disclosure.

The data acquisition interface 131 acquires driving data on the vehicle 20, which is a mining vehicle having dual wheels (step S1).

The wear state calculator 132 calculates the wear state of the tire 30 at each of the defined calculation positions (step S2). As described above, two or more calculation positions are defined in one tire 30. In one tire 30, at least one of the calculation positions is included in a region where the wear state may become uneven (the outer side of mounting or the inner side of mounting of the dual wheel), and at least one other calculation position is included outside of that region.

The wear state corrector 133 determines whether correction is necessary for each of the calculation positions (necessity of correction) and performs correction if necessary. The wear state corrector 133 selects one calculation position, and in a case in which the selected calculation position is on the outer side of mounting or the inner side of mounting of the dual wheel (Yes in step S3), the process proceeds to step S4. In a case in which the selected calculation position is not on the outer side of mounting or the inner side of mounting of the dual wheel (No in step S3), the process proceeds to step S7 without correction being performed.

In a case in which adjustment based on data on the environment is necessary (Yes in step S4), such as when there is rainfall or the properties of the road surface differ significantly from assumptions, the wear state corrector 133 adjusts the correction factor (step S5). The wear state corrector 133 does not adjust the correction factor in a case in which no adjustment based on data on the environment is necessary (No in step S4). The wear state corrector 133 then corrects the wear state calculated by the wear state calculator 132 to increase wear (step S6).

In a case in which the wear state corrector 133 has determined whether correction is necessary for all calculation positions (Yes in step S7), the process of step S8 is performed. In a case in which there is a calculation position for which the determination of whether correction is necessary has not been made (No in step S7), the wear state corrector 133 selects another calculation position and returns to the process in step S3.

The output interface 134 outputs the wear state for each calculation position of the tire 30, as calculated by the wear state calculator 132 or corrected by the wear state corrector 133, to a display apparatus or the like (step S8). As mentioned above, information on the wear state may be displayed along with the wear state.

As described above, the tire management apparatus 10 and the tire management method according to the present embodiment can, with the aforementioned configuration, accurately calculate the wear state of tires of mining vehicles. In addition, the highly accurate indication of the wear state of the tires 30 enables appropriate management, such as replacement of the tires 30 at the appropriate timing.

Although embodiments of the present disclosure have been described based on the drawings and examples, it is to be noted that various changes or modifications will be apparent to those skilled in the art based on the present disclosure. Therefore, such changes or modifications are to be understood as included within the scope of the present disclosure. For example, the functions and the like included in the components, steps, and the like may be reordered in any logically consistent way, and components, steps, and the like may be combined into one or divided. An embodiment of the present disclosure can also be realized as a program to be executed by a processor provided in an apparatus or as a storage medium with a program recorded thereon. Such embodiments are also to be understood as included within the scope of the present disclosure.

In the above embodiment, the wear state calculator 132 calculates the wear state of the tire 30 using the friction energy Ew, but a parameter other than the friction energy Ew may be used. The wear state calculator 132 may calculate the wear state of the tire 30 using a model generated by machine learning.

The correction factor is not limited to factors that provide the slope of a linear relationship as in the above embodiment. The wear state corrector 133 may adjust by an additional correction amount, instead of the correction factor, based on the data on the environment. The additional correction amount may, for example, be further added to or subtracted from the corrected value of the wear state calculated by the wear state calculator 132.

The configuration of the tire management apparatus 10 may be freely chosen. For example, the processing executed by the tire management apparatus 10, which is one computer in the above embodiment, may be executed by distributed processing among a plurality of computers. For example, the server 60 in the tire management system 1 may execute some of the processing of the tire management apparatus 10 (such as the processing of the data acquisition interface 131).

REFERENCE SIGNS LIST

1 Tire management system
10 Tire management apparatus
11 Communication interface
12 Memory
13 Controller
20 Vehicle
30 Tire
40 Network

50 Terminal apparatus
60 Server
131 Data acquisition interface
132 Wear state calculator
133 Wear state corrector
134 Output interface

The invention claimed is:

1. A tire management apparatus for managing tires attached to a mining vehicle having a dual wheel, the tire management apparatus comprising:

a memory that stores a function used in calculation of a wear state of the tire;

a data acquisition interface configured to acquire driving data on the mining vehicle;

a wear state calculator configured to define two or more calculation positions in one tire and calculate a wear state of the one tire at each defined calculation position based on the acquired driving data, by using the function read from the memory according to the type of the tire;

a wear state corrector configured to perform correction of the calculated wear state to increase wear in a case in which the calculation position is on an outer side of mounting or an inner side of mounting of the dual wheel; and an output interface that outputs a corrected wear rate to a display apparatus.

2. The tire management apparatus according to claim 1, wherein the driving data includes data on an environment in which the mining vehicle drives, and the wear state corrector is configured to adjust a correction factor used in the correction based on the data on the environment.

3. The tire management apparatus according to claim 2, wherein the data on the environment includes weather information including presence or absence of rainfall, and the wear state corrector is configured to adjust the correction factor to increase wear in a case in which rainfall is determined to be present based on the weather information.

4. The tire management apparatus according to claim 2, wherein the data on the environment includes road surface information on a road surface on which the mining vehicle drives, and the wear state corrector is configured to adjust the correction factor according to a property of the road surface based on the road surface information.

5. A non-transitory computer-readable recording medium including computer program instructions configured to cause a tire management apparatus for managing tires attached to a mining vehicle having a dual wheel to execute operations, the tire management apparatus includes a memory that stores a function used in calculation of a wear state of the tire, the operations comprising:

acquiring driving data on the mining vehicle;

defining two or more calculation positions in one tire and calculating a wear state of the one tire at each defined calculation position based on the acquired driving data, by using the function read from the memory according to the type of the tire;

performing correction of the calculated wear state to increase wear in a case in which the calculation position is on an outer side of mounting or an inner side of mounting of the dual wheel; and outputting a corrected wear rate to a display apparatus.

6. A tire management method to be executed by a tire management apparatus for managing tires attached to a mining vehicle having a dual wheel, the tire management apparatus includes a memory that stores a function used in calculation of a wear state of the tire, the tire management method comprising:

acquiring driving data on the mining vehicle;

defining two or more calculation positions in one tire and calculating a wear state of the one tire at each defined calculation position based on the acquired driving data, by using the function read from the memory according to the type of the tire;

performing correction of the calculated wear state to increase wear in a case in which the calculation position is on an outer side of mounting or an inner side of mounting of the dual wheel; and outputting a corrected wear rate to a display apparatus.

7. The tire management apparatus according to claim 3, wherein the data on the environment includes road surface information on a road surface on which the mining vehicle drives, and the wear state corrector is configured to adjust the correction factor according to a property of the road surface based on the road surface information.

8. The tire management apparatus according to claim 1, wherein a suggestion for changing a mounting position of the dual wheel tires is displayed based on the corrected wear rate.

9. The non-transitory computer-readable medium according to claim 5, wherein a suggestion for changing a mounting position of the dual wheel tires is displayed based on the corrected wear rate.

10. The tire management method according to claim 6, wherein a suggestion for changing a mounting position of the dual wheel tires is displayed based on the corrected wear rate.

* * * * *